Patented Nov. 15, 1938

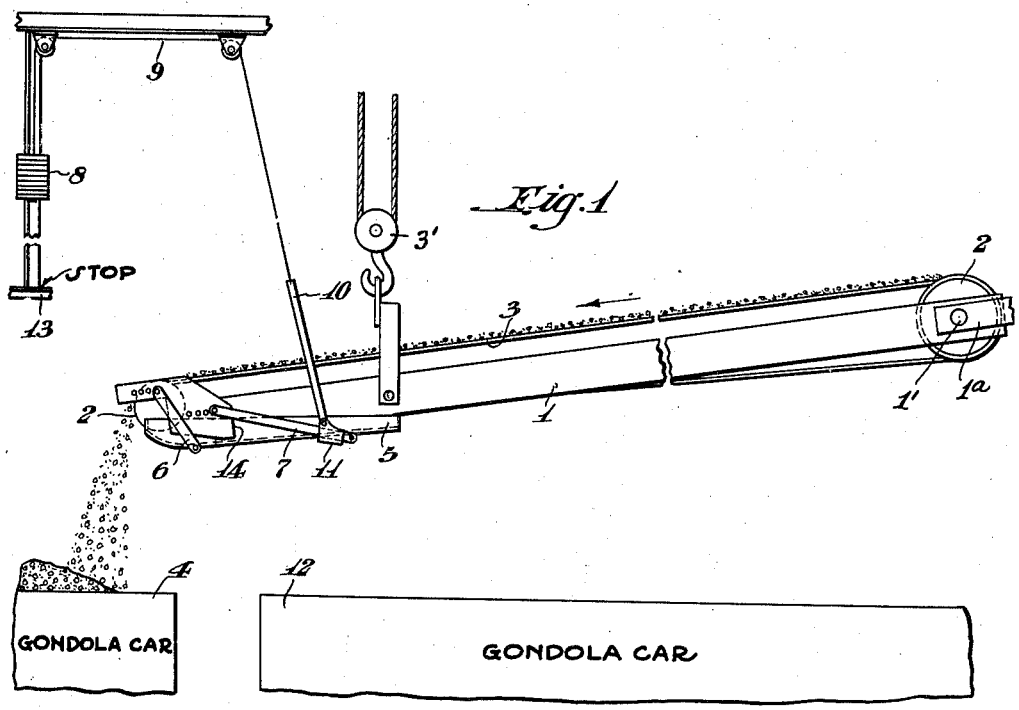
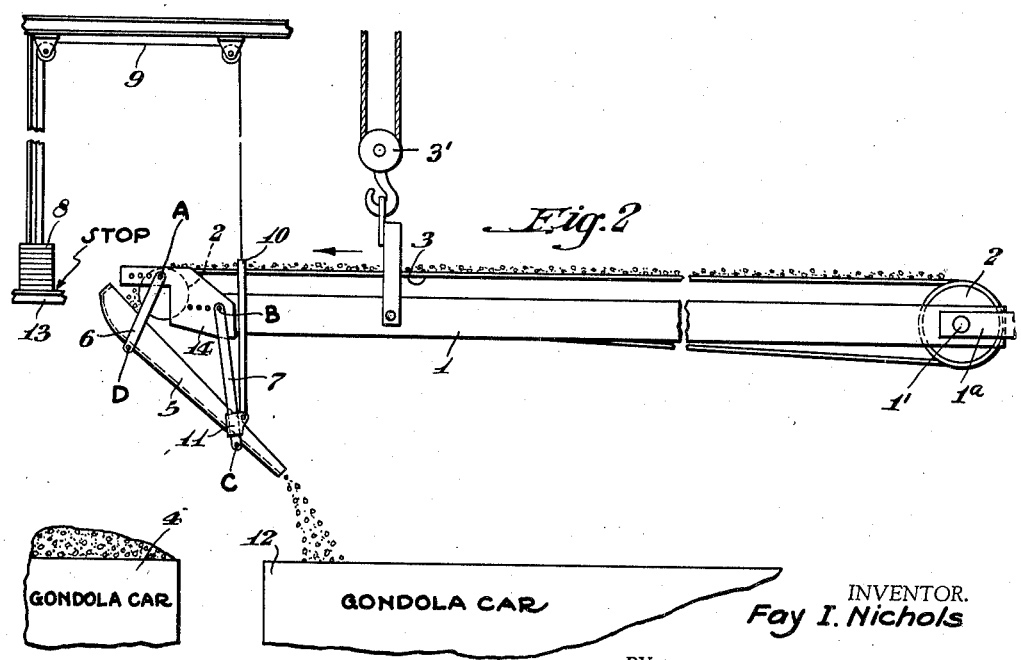

2,136,560

UNITED STATES PATENT OFFICE 2,136,560

CONVEYER DISCHARGE APPARATUS

Fay I. Nichols, Pittsburgh, Pa., assignor to Koppers-Rheolaveur Company, a corporation of Delaware Application August 3, 1935, Serial No. 34,573

3 Claims. (Cl. 198—72)

My invention relates in general to equipment for the handling of materials and more particularly to an improvement in the use and means of controlling the actuation of chutes designed to intermittently change the direction of flow of materials in systems wherein they are transported and distributed.

It is an experience common to those engaged in distributing to separate receiving places materials discharged from the end of a conveyer supported on a boom, that difficulties are encountered in changing receptacles or alternately redirecting the flow of the discharging materials without incurring spillage and loss in so doing. Situations of this nature arise more especially, for example, in those cases where circumstances require the distribution of the conveyed material into a series of receptacles which are continuously or intermittently moving beneath the end of the boom. In the case where a train of cars is continuously loaded with coal from the same conveyer, the space interval between the ends of the individual cars will occasion spillage of the coal being loaded unless means are taken to prevent it. Such means may constitute discontinuing the loading operation by closing the feed supply, until the next car in the series is brought into proper receiving position. This is inefficient and time consuming. Or, in those instances where the feeding rate is small and the potential storage capacity of the conveyer itself is of such magnitude as to retain thereon that quantity of material accumulating during the time interval required to place the next car in proper loading position, the conveyer may be stopped, and if such provision is made in the installation, the boom may be elevated an amount which will cause the coal to be held on the conveyer and be later discharged into the next car after it is spotted in position beneath the boom, and the same is lowered. Such practice may be effectual at low feed rates on a high capacity conveyer, but results in losses at higher rates and both procedures are make-shift which disturb the even flow of a continuous loading operation, require close supervision; and in those cases where high capacities are desired, defeat that end.

The object of my invention, therefore, is to provide a device which, under circumstances of the aforedescribed nature, will be simple and effective in diverting the flow of a material from one receptacle into another of a series which is constantly or intermittently moving beneath the loading stream, so as to avoid spillage and loss of loading efficiency.

My invention comprises placing beneath the loading boom supporting a conveyer and in juxtaposition thereto, a chute which is linked to the boom in such manner as to be extensible and retractable, and which may be actuated independently of or by movement of said supporting boom.

In the accompanying drawing forming a part of this specification and showing for purposes of exemplification a preferred apparatus and method in which the invention may be embodied and practised but without limiting the claimed invention specifically to such illustrative instance or instances, Figure 1 is a longitudinal view in elevation of an exemplifying instance of my inprovement wherein the subject of the invention is in retracted and non-operating position, while material is being discharged from a conveyer boom into a car; and Figure 2 is a similar view of such installation showing the loading chute in its extended and operating position and diverting the conveyed material into the following car of the series.

The same characters of reference designate the same parts in each of the views of the drawing.

Referring now to the drawing, in Figure 1 is shown a loading boom 1 inclined at an angle to the horizontal which is its normal position while loading. At each end of said boom is found a pulley 2 upon which travels an endless belt 3 that transports material from the elevated to the lower end of the boom in the direction indicated by the arrow. The transported material falls from the lower end of the said boom into a receiver below, such as the gondola car 4.

Beneath the boom at its lower end is suspended the chute 5, which when the loading boom is in its normal operating position is drawn up against the underside of the boom as shown in Figure 1. This chute is affixed to the boom by means of the links 6 and 7 on each side and is held against the boom by the counterweight 8 which operates in guides mounted on the framework of the surrounding building. The counterweight is attached to the chute by means of line 9 and bail 10, the latter being rotatably attached to bail-clip 11. The bail-clip is made fast to the lower end of the lever 7. To obviate loss in the effectiveness of the mass of the counterweight, the line connecting the counterweight and the bail passes over two sheaves as shown.

At such time as loading of the gondola car 4 is completed and it is desired to direct the flow of material discharging from the lower end of the conveyer into the next car of the series as 12 and without stopping the feeding onto the conveyer belt 3 for the purpose of bringing the next car into a position directly under the discharging end of the boom, the boom 1 is raised about pivot 1' of support 1a by any suitable means 3' until it reaches some such position as indicated in Figure 2. This upward movement of the boom effects a downward movement of the counterweight 8, which continues to descend along the aforementioned guides until it reaches the stop 13. As the boom continues to rise, the supporting effect of the counterweight having been removed, the chute 5 starts to descend because of its own weight, with the result that the feed-end of the chute is moved into position in front of the discharging end of the boom and assumes a station as shown in Figure 2. In so doing, the stream of coal falling into gondola car 4 is intercepted and diverted into the car 12. The loaded car 4 is then moved from its position and the car 12 spotted beneath the discharging end of the boom and the change of receivers will have been effected without stopping of the feed and without spillage between the cars. As soon as the car now being loaded is brought into convenient position, the boom is again lowered into normal loading station, thereby causing the counterweight 8 to leave the stop 13 which by its mass effects a movement of the chute back to its original position adjacent the boom as in Figure 1.

An important part of my invention is the type of movement contributed to the chute by the supporting links 6 and 7. This movement must be positive and capable of exact repetition in successive operations; it should be such that its path across the falling stream of materials is short and quickly completed and furthermore, in its descent, the angularity of the chute itself to the horizontal should be such at its entrance into the material stream that the angle of repose of the conveyed material is exceeded, thereby giving assurance of no lodging of materials within the chute and permitting a rapid discharge therefrom. Similarly, when the chute is being returned to its non-operating position by the action of the counterweight, its charging end should emerge from the stream of flowing material while the entire chute is inclined sufficiently to assure of complete discharge of any material thereon before it reaches the fully retracted position. Moreover, the links should be capable of adjustment so that the position of the chute may be altered to meet specific requirements as to material size, rates of flow and belt adjustments.

In my invention, I have found the type of movement given to the chute by causing the links 6 and 7 to move in relation to each other in a manner as the "drag link" mechanism to be effective in producing the desired result, although I do not limit myself to a mechanism of this particular type. As a specific example, but without limiting myself to such illustrative instance the following lengths of the links controlling the path taken by the chute have been found effective for my purpose.

Referring to Figure 2, the distance

A to B may be 1' 11⅝".
B to C may be 4' 4".
C to D may be 4' 7".
A to D may be 2' 4".

Two parallel series of holes in the chute-support 14 may be used to adjust the distance of the loading end of the chute from the discharging end of the conveyer belt as would be required by shortening or lengthening of the conveyer belt.

In the aforedescribed exemplification of my improvement, gravitational means has been used to release the chute into and remove it from operating position. These operations can, however, be equally effectively brought about by mechanical, electrical or manual means and I therefore do not restrict the invention to any special devices for so doing.

The invention as hereinabove set forth is embodied in particular form and manner but may be variously embodied within the scope of the claims hereinafter made.

I claim:

1. The combination of a conveyer boom shiftable about a horizontal axis to raise and lower the delivery end thereof, a transfer chute mounted beneath the delivery end of said boom to turn on a horizontal axis, said chute being deeper at its receiving end than at its delivery end for receiving material from the delivery end of the boom and delivering said material in a direction the reverse of that of said boom, and means shifting the axis of the chute longitudinally of the boom and turning said chute into and out of receiving relation with the delivery end of the boom when said delivery end is raised and lowered, said means comprising long swinging links fulcrumed on the boom and connected with the chute in proximity to its rear delivery end and short swinging links fulcrumed on the boom and connected with the chute at its aforesaid pivotal axis in proximity to the forward receiving end of the chute.

2. The combination of a conveyer boom shiftable about a horizontal axis to raise and lower the delivery end thereof, a transfer chute beneath said boom and pivoted to the delivery end thereof by short swinging links fulcrumed on the boom and connected with the chute in proximity to its forward end and longer swinging links fulcrumed on the boom and connected with the chute in proximity to its rear end, a power device holding said chute folded up under said boom when the delivery end of the boom is lowered, and means relieving the chute from the action of said power device when the delivery end of the boom is raised, whereby said chute turns on its axis into a downwardly and rearwardly inclined position when the delivery end of the boom is raised.

3. The combination of a conveyer boom shiftable on a horizontal axis to lower and raise the delivery end thereof, a rearwardly extending transfer chute pivoted beneath the delivery end of the boom by short swinging links fulcrumed on the boom and connected with the chute in proximity to its forward end, longer swinging links fulcrumed on the boom and connected with the chute in proximity to its rear end, a weight operatively connected to said chute and holding the same folded up beneath the boom when the delivery end of the boom is in lower position, and a stop receiving and supporting said weight when the delivery end of the boom is raised.

FAY I. NICHOLS.